(12) United States Patent  (10) Patent No.: US 8,457,107 B2
Krishnaswamy (45) Date of Patent: Jun. 4, 2013

(54) METHOD AND SYSTEM FOR FINDING SHORTEST PATHS IN RING NETWORKS

(75) Inventor: Murali Krishnaswamy, Piscataway, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 649 days.

(21) Appl. No.: 12/685,957

(22) Filed: Jan. 12, 2010

(65) Prior Publication Data

US 2011/0170406 A1  Jul. 14, 2011

(51) Int. Cl.
*H04L 12/42* (2006.01)
(52) U.S. Cl.
USPC .......................................................... 370/351
(58) Field of Classification Search
USPC ........... 370/351–356, 400, 406; 709/238–244
See application file for complete search history.

(56) References Cited

U.S. PATENT DOCUMENTS

| 6,545,977 | B2* | 4/2003 | Harshavardhana et al. .. 370/222 |
| 6,744,769 | B1* | 6/2004 | Siu et al. ................... 370/395.32 |
| 6,934,248 | B1* | 8/2005 | DeBoer et al. ................. 370/217 |
| 7,761,006 | B2* | 7/2010 | Katagiri et al. .................. 398/59 |
| 2003/0009598 | A1* | 1/2003 | Gunluk et al. ................ 709/251 |
| 2005/0135804 | A1* | 6/2005 | Rashid et al. ..................... 398/4 |

* cited by examiner

*Primary Examiner* — Dmitry H Levitan

(57) ABSTRACT

An approach for determining shortest paths within a multiple ring network. Topology information associated with a ring network that includes a plurality of rings is retrieved, wherein each of the rings includes one or more nodes. A start node and an end node associated with the ring network are selected. A minimum set of one or more interconnected rings of the ring network is determined. One or more shortest paths between the start node and the end node are determined based on the determined minimum set.

17 Claims, 18 Drawing Sheets

METHOD AND SYSTEM FOR FINDING SHORTEST PATHS IN RING NETWORKS

BACKGROUND INFORMATION

Networks enable the sharing and transmission of a wide array of resources between network elements, also called nodes. Among several topologies to physically connect nodes to each other including mesh topology, bus topology, star topology, etc., the ring topology is highly popular owing to its simple construction. One application of the ring architecture is in computer networks such as interconnecting computers and related devices within a local area network (LAN). Another substantial technology that is based on the ring architecture is the synchronous optical network (SONET) standard or the newer dense wavelength division multiplexing (DWDM) for interconnecting nodes to each other within the public switched telephone network (PSTN) or routers in the Internet backbone or video switches/servers. Given the demands with respect to bandwidth, network availability, fault tolerance, and quality of service, the use of multiple ring architectures have emerged as a viable approach. However, the efficient and effective determination of communication paths (e.g., shortest paths) in multi-ring systems has increased in complexity, thereby hindering rapid recovery of network failures and complicating network management.

Based on the foregoing, there is a need for an efficient for determining paths within a multiple ring network.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and system for finding shortest paths in ring networks is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to shortest path first (SPF) algorithms, it is contemplated that other equivalent graph search algorithms may be used.

Figure 1A:
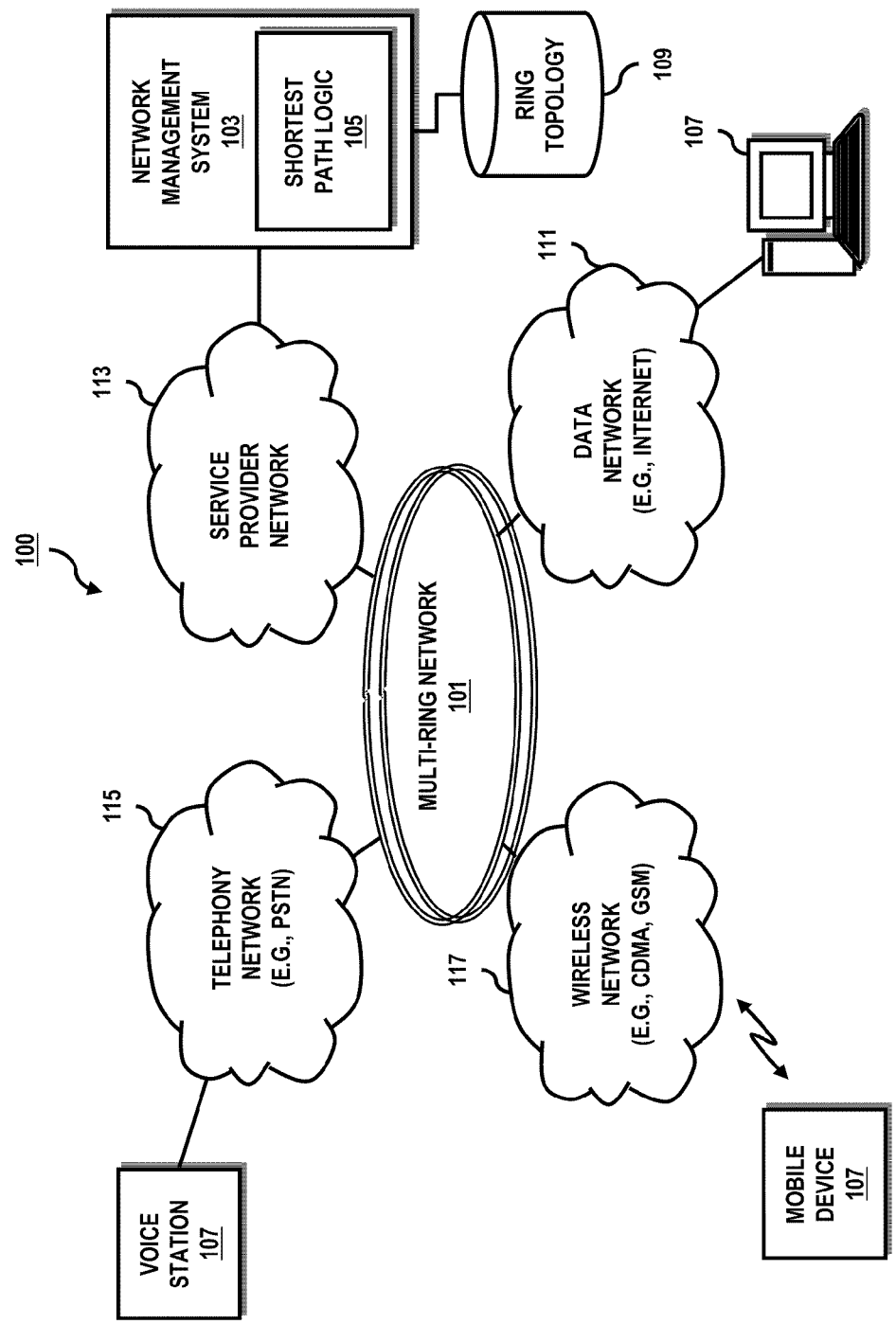
FIGS. 1A and 1B are diagrams of, respectively, a communication system capable of determining shortest paths within a multi-ring network, and an exemplary multi-ring network, according to various embodiments.
Figure 1B:
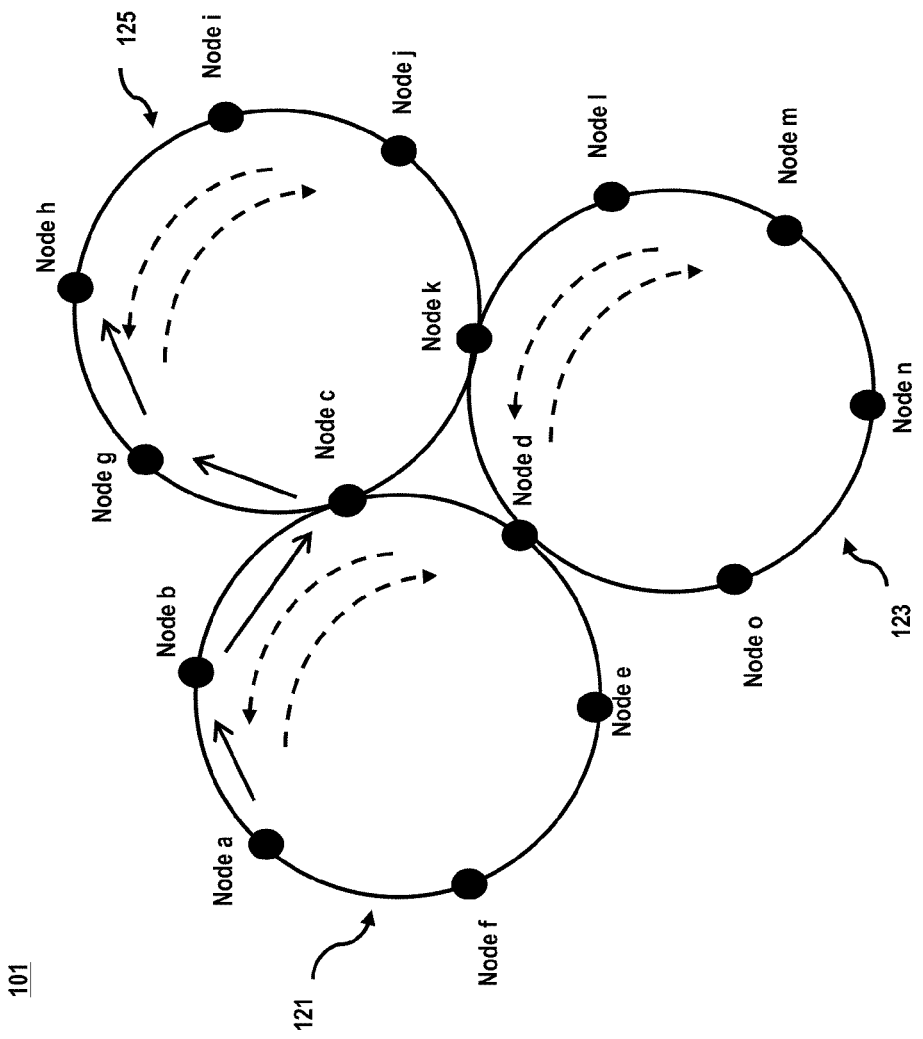

FIGS. 1A and 1B are diagrams of, respectively, a communication system capable of determining shortest paths within a multi-ring network, and an exemplary multi-ring network, according to various embodiments. For illustrative purposes, system 100 is described with respect to finding shortest paths in a multiple ring network 101. In this example, a network management system 103 employs a shortest path logic 105 configured to execute a shortest path first (SPF) algorithm, while taking into account ring specific features and user policies; the system 103 maintains a database 109 to store information relating to the topologies of the ring network 101 as well as the interconnections of the rings. According to certain embodiments, the multi-ring network 101 provides a transport network for various end user devices 107 (e.g., computing device, voice station 107, and/or another mobile device) to communicate. The ring network 101 can interconnect one or more networks, such as data network 111, service provider network 113, telephony network 115, and/or wireless network 117. This ring network 101, in one embodiment, may be a part of the service provider network 113 in providing a backbone network to the various networks 111-117.

As such, the network 113 may operate using a host of technologies, such as asynchronous transfer mode (ATM) network, frame relay network, integrated services digital network (ISDN), Internet Protocol (IP) network, multiprotocol label switching (MPLS) network, or synchronous optical network (SONET), as well as any other suitable technologies.

Networks 111-117 may be any suitable wireline and/or wireless network. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, service provider network 113 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions.

According to exemplary embodiments, end user devices 107 may include any customer premise equipment (CPE) capable of sending and/or receiving information over one or more of networks 111-117. For instance, voice terminal 107 may be any suitable plain old telephone service (POTS) device, facsimile machine, etc., whereas mobile device (or terminal) 107 may be any cellular phone, radiophone, satellite phone, smart phone, wireless phone, or any other suitable mobile device, such as a personal digital assistant (PDA), pocket personal computer, tablet, customized hardware, etc. Further, computing device 107 may be any suitable computing device, such as a VoIP phone, skinny client control protocol (SCCP) phone, session initiation protocol (SIP) phone, IP phone, personal computer, softphone, workstation, terminal, server, etc.

To assist with traffic engineering, service providers negotiate and apportion network capacity on general or subscriber-specific bases through service level agreements (SLA). These agreements define various communication service parameters in terms of bandwidth allocations, latency, jitter, etc. and may be enforced using network management system 103. Units of data (e.g., blocks, cells, frames, packets, etc.) transmitted across the ring network 101 can be typically "policed" according to one or more committed rates of service, such as a committed burst bandwidth. These committed rates of service are generally associated with particular connection(s), e.g., links, pathways, etc., or other network parameters, e.g., incoming/outgoing interface, destination/source node, machine access control address, etc.

Physical layer determinations of the optimal flow path (or shortest path) can be based on network cost and/or metrics values that are preassigned between nodes (e.g., network elements) of the network 101 based on factors such as physical distance between nodes and other factors that determine normal latency between nodes. If a failure occurred at any point along the flow path on one of the rings (e.g., SONET rings) within network 101, then SONET add/drop multiplexers (ADMs), in conjunction with the network management system 103, can transparently reroute traffic along a different path (e.g., a protection path) to achieve the same final destination as originally planned.

In certain embodiments, individual rings of network 101 may be interconnected to each other with other rings at certain nodes. For numerous applications, connection paths between nodes in the ring network 101 need to be determined over a multitude of interconnected rings. To optimize the use of network resources, the connection path is, according to one embodiment, the shortest path between a start node and an end node in the network 101. This shortest path may include one or more intermediate nodes and the connecting links between nodes.

A number of well known methods and algorithms can be used to determine the shortest paths between nodes with mesh networks; for example, the Dijkstra algorithm. These algorithms used for mesh networks can similarly be applied to ring networks for calculating shortest paths. One drawback of employing this practice, however, is that many of the ring specific features such as number of intermediate rings and paths over the ring segments, ring interconnections, user enforced ring specific policies etc. are transparent to these approaches. The result is that the computed shortest paths may not meet the requirements of the user or system.

Therefore, the approach of system 100, according to certain exemplary embodiments, stems from the recognition that traditional application of shortest path algorithms to a multiple ring architecture are ineffective.

As shown, the network management system 103 possess the capability, via logic 105, to find shortest paths in the multiple ring network 101. One exemplary configuration for the multi-ring network 101 is illustrated in FIG. 1B.

By way of example, three individual ring networks 121, 123, and 125, wherein ring network 121 includes nodes a-f Ring network 123 comprises nodes d, k, l, m, n and o, while ring network 125 includes nodes c, g, h, i, j, and k. These ring networks 121, 123, and 125 are interconnected to each other at various nodes such as nodes c, d and k. Each node in the network receives data from a neighboring node and forwards data to an adjacent node. Transmission between nodes may occur in the clockwise or counter-clockwise direction, or both directions simultaneously (as shown in the diagram with the arrows). An exemplary path for transmitting data between two nodes is depicted, from node a and node h. For many applications, it is desirable to find the shortest path between nodes, as being able to transmit data along the shortest path oftentimes minimizes the cost of transmitting the data from one node to another.

As mentioned, the Dijkstra algorithm may not be as useful for determining shortest paths (SPFs) within ring networks. In some cases it may be necessary to find two or more SPFs that are L-N (Link-Node) disjoint from each other where the SPFs do not share a common node or link along their path. In this case the SPF with the lowest "value or cost" would be considered as the working path for the connection between the two nodes, whereas the other SPF(s) would be used as the protection path(s).

Moreover, for ring networks, where two or more SPFs are required between a pair of nodes, there could be an additional constraint. For example, it may be required that the SPFs be ring disjoint. In such cases the SPFs must not traverse any common intermediate ring along their path (although they may however share the same start and end rings).

A path with the lowest total "cost" between a pair of nodes is the SPF between them. The total cost is the summation of individual costs between adjacent nodes along the path. Many parameters (or combinations of them with appropriate weight for each one of them) may be used as cost. By way of example, these parameters may include: physical distance between nodes, number of nodes along the path, type of nodes, bandwidth of the links, percentage utilization of the links, number of intermediate rings, set policies etc.

While specific reference will be made hereto, it is contemplated that multi-ring network 101 may embody many forms and include multiple and/or alternative components and facilities.

Figure 3:
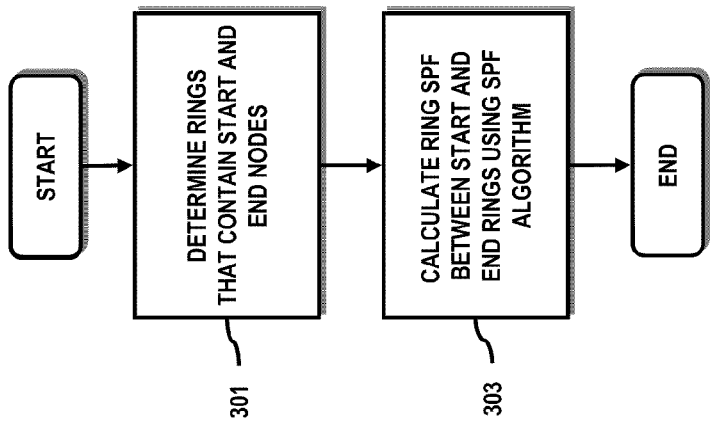
FIGS. 2 and 3 are flowcharts of a process for determining shortest path first (SPF) paths, according to one embodiment.
Figure 2:
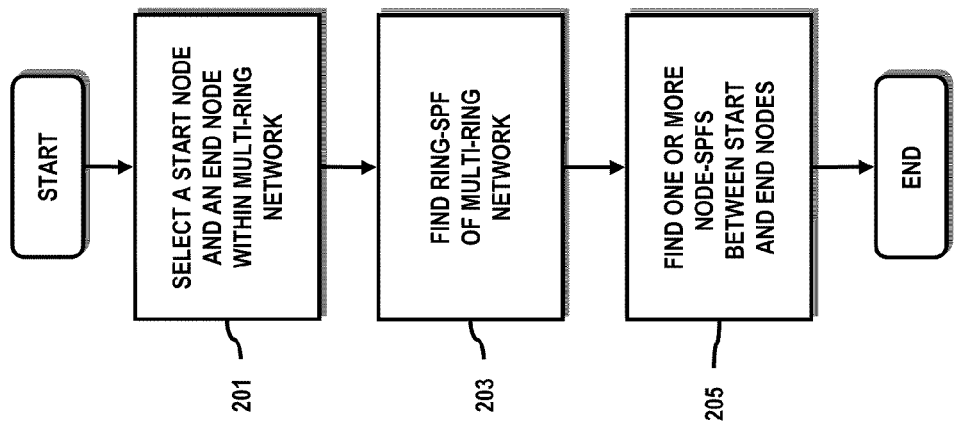

FIGS. 2 and 3 are flowcharts of a process for determining shortest path first (SPF) paths, according to one embodiment. A two-stage approach can be used to find the SPFs between a pair of nodes—i.e., referred to as "node-SPF." The process, as executed by shortest path logic 105, can retrieve topology information (which can specify the relationship of the nodes and the interconnections of the rings) associated with the multi-ring network 101 from the ring topology database 109. In certain embodiments, shortest path logic 105 utilizes the Dijkstra's algorithm (Table 1):

TABLE 1

```
1   function Dijkstra(Graph, source):
2       for each vertex v in Graph:        // Initializations
3           dist[v] := infinity            // Unknown distance function from
source to v
4           previous[v] := undefined       // Previous node in optimal path
from source
5       dist[source] := 0                  // Distance from source to source
6       Q := the set of all nodes in Graph
            // All nodes in the graph are unoptimized - thus are in Q
7       while Q is not empty:              // The main loop
8           u := vertex in Q with smallest dist[ ]
9           if dist[u] = infinity:
10              break                      // all remaining vertices are
inaccessible from source
11          remove u from Q
12          for each neighbor v of u:      // where v has not yet been
removed from Q.
13              alt := dist[u] + dist_between (u, v)
14              if alt < dist[v] :         // Relax (u, v, a)
15                  dist[v] := alt
16                  previous[v] := u
17      return dist[ ]
```

As seen in FIG. 2, in step 201, the process selects a start node and an end node within the multi-ring network 101. Next, the process finds, as in step 203, the minimum set of interconnected rings required for the path between a start node and an end node (referred to as "ring-SPF"). Next, in step 205, the process determines one or more shortest paths (i.e., node-SPFs) between the start and end nodes on this discovered ring-SPF, i.e., set of rings. If two node-SPFs (e.g., working and protection paths) are required, additional steps are performed as explained below with respect to FIG. 3.

In order to determine the ring-SPF of stage 201, a two-step approach is also needed.

FIG. 3 is a flowchart of a process for determining shortest path first (SPF) paths, according to one embodiment. In step 301, the process determines the ring(s) that contain the start and end nodes. Thereafter, the ring-SPF (shortest path) between the start and end rings is calculated by use a SPF algorithm (e.g., Dijkstra algorithm) or other equivalent graph search algorithms.

Figure 4:
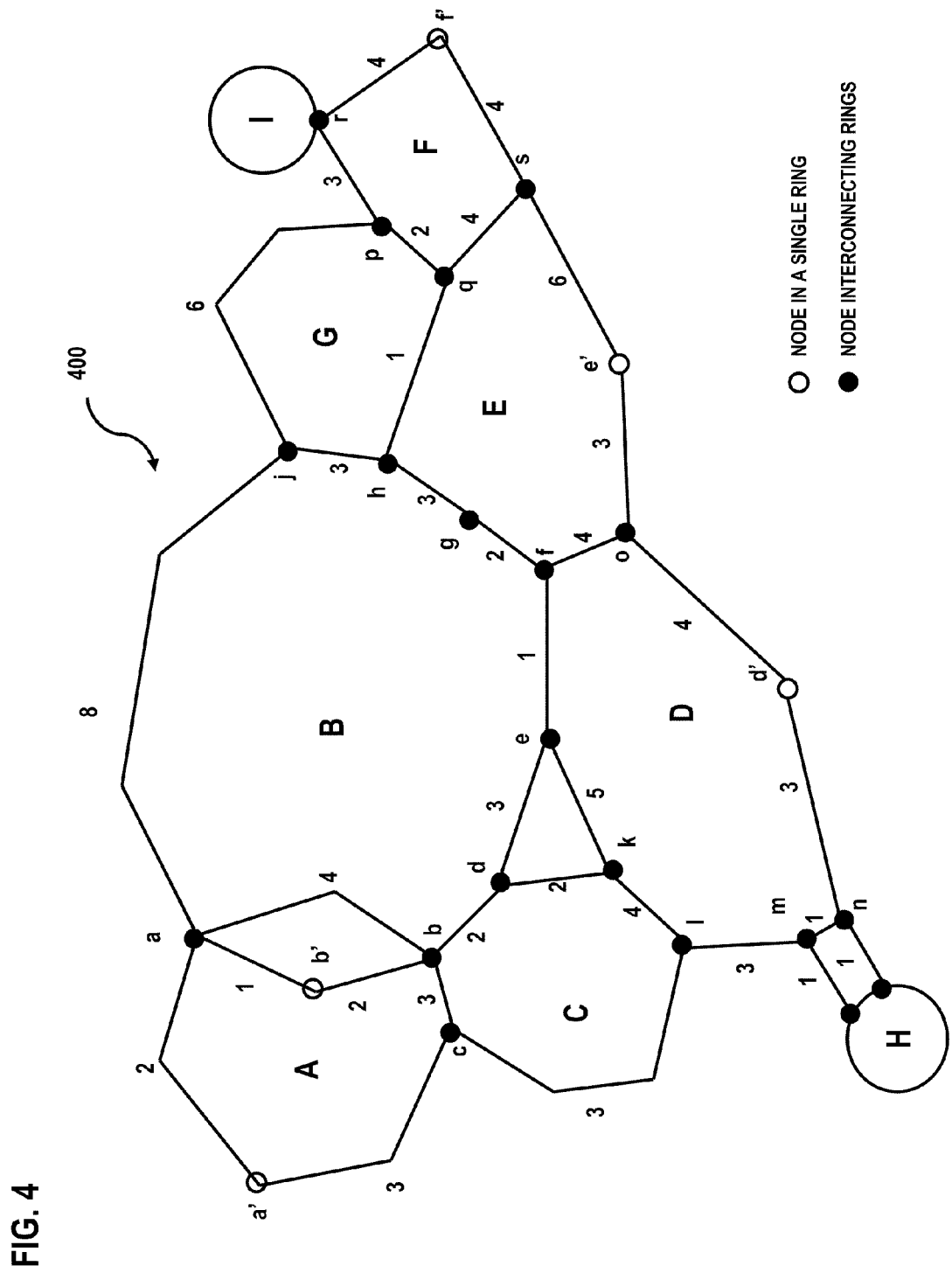
FIG. 4 is diagram of an exemplary ring network for use in the system of FIG. 1A.

FIG. 4 is a diagram of an exemplary ring architecture that is used within this description to explain the process of FIG. 3. Under this scenario, the ring network 101 includes nine rings, A to I, which are interconnected through one or more common nodes. The filled circles represent nodes that interconnect rings, while the unfilled circles represent nodes that do not interconnect to other rings (i.e., node within a single ring). In some cases, the common nodes interconnect more than two rings—e.g., node b interconnects three rings A, B and C. In most cases, each ring has at least two interconnection nodes to other rings. A special case is ring I interconnected at a single node to ring F. The case of ring H interconnecting to ring D through point-to-point links is also shown. For the sake of clarity, only a few nodes in each ring are shown. The link cost (or metric), i.e., cost of the path between two adjacent nodes, is also illustrated.

Figure 5:
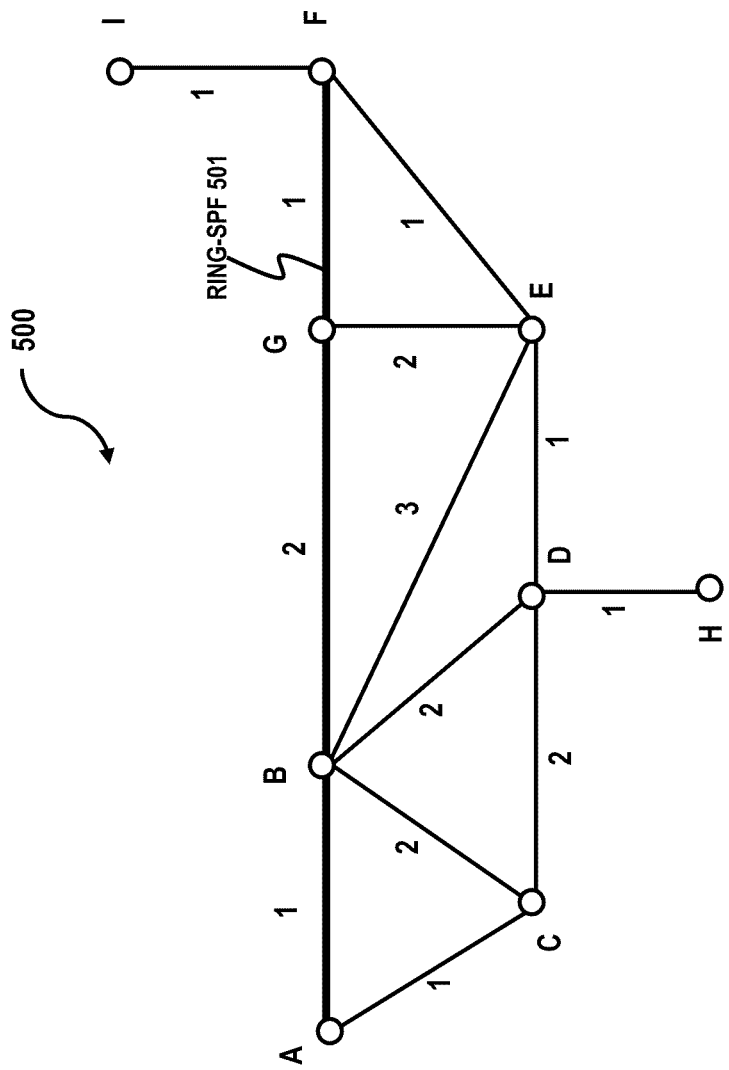
FIG. 5 is diagram of a mesh view of ring interconnections of the network of FIG. 4.

FIG. 5 is diagram of a mesh view of ring interconnections for the ring configuration of FIG. 4. In particular, a modified graph 500 illustrates interconnection details at the ring level—i.e., each ring is treated as (or collapsed into) a node and the resulting mesh connections among them. The cost of ring interconnections (i.e., the cost of hopping from one ring to another) is also shown.

In the following description, the exemplary ring architecture of FIGS. 4 and 5 are used to explain steps 301 and 303 collectively corresponding to step 201 of FIG. 2. In order to find the ring-SPF between nodes a' and f', it is determined that node a' is in ring A and f' is in ring F. Thus, the ring-SPF between A and F is determined, as in FIG. 5. In this example, applying an SPF algorithm, it is concluded that the shortest path A-B-G-F with cost=4 is the ring-SPF 501.

As another example, to find the ring-SPF between nodes a and q, it is determined that node a belongs to rings A and B, and q belongs to rings E, F and G. Again applying an SPF algorithm to all the six possible combinations of start and end rings (A-E, A-F, A-G, B-E, B-F and B-G) it is found that B-G with cost=2 is the shortest path, and thus is the ring-SPF.

Similarly, to find the ring-SPF between nodes a' and d', it is concluded that node a' is in Ring A and d' is in ring D. From SPF algorithms, it is determined that there are two ring-SPFs (cost=3) exist: A-B-D and A-C-D. In such cases both the ring-SPFs are considered for node-SPF calculations (as will be explained below); and the one over which the node-SPF is the shortest is selected as the ring-SPF.

Figure 6:
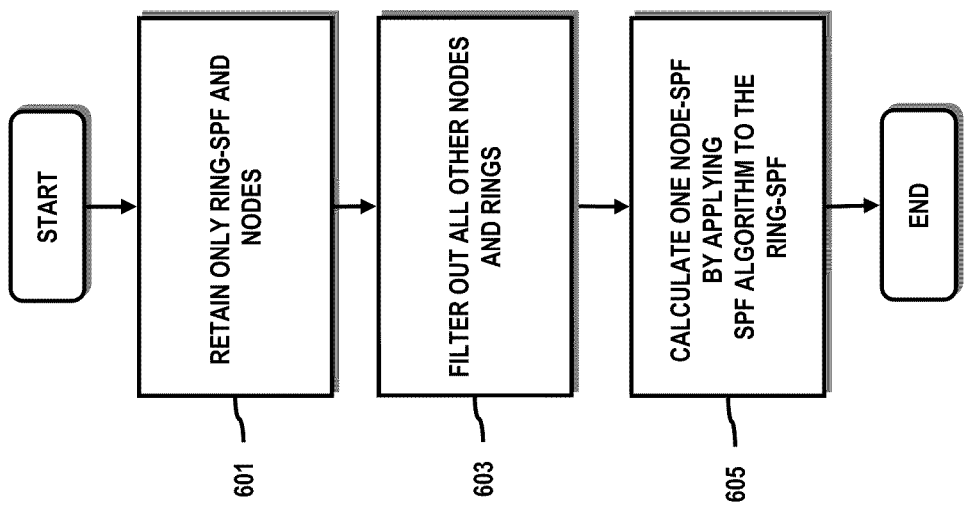
FIG. 6 is a flowchart of a process for determining one node-SPF, according to one embodiment.

FIG. 6 is a flowchart of a process for determining one node-SPF, according to one embodiment. Similar to the two-step approach (of FIG. 2) used to calculate the ring-SPFs of step 201, the step of determining the ring-SPF (step 203) can be also calculated in two stages, as illustrated in FIG. 6. In step 601, the process keeps only the ring-SPF and their nodes calculated in step 201, whereby all other nodes and rings are filtered out (step 603). The node-SPF is calculated by applying well known SPF algorithms (e.g., Dijkstra algorithm) to the ring-SPF (set of calculated rings), as in step 605.

Figure 7:
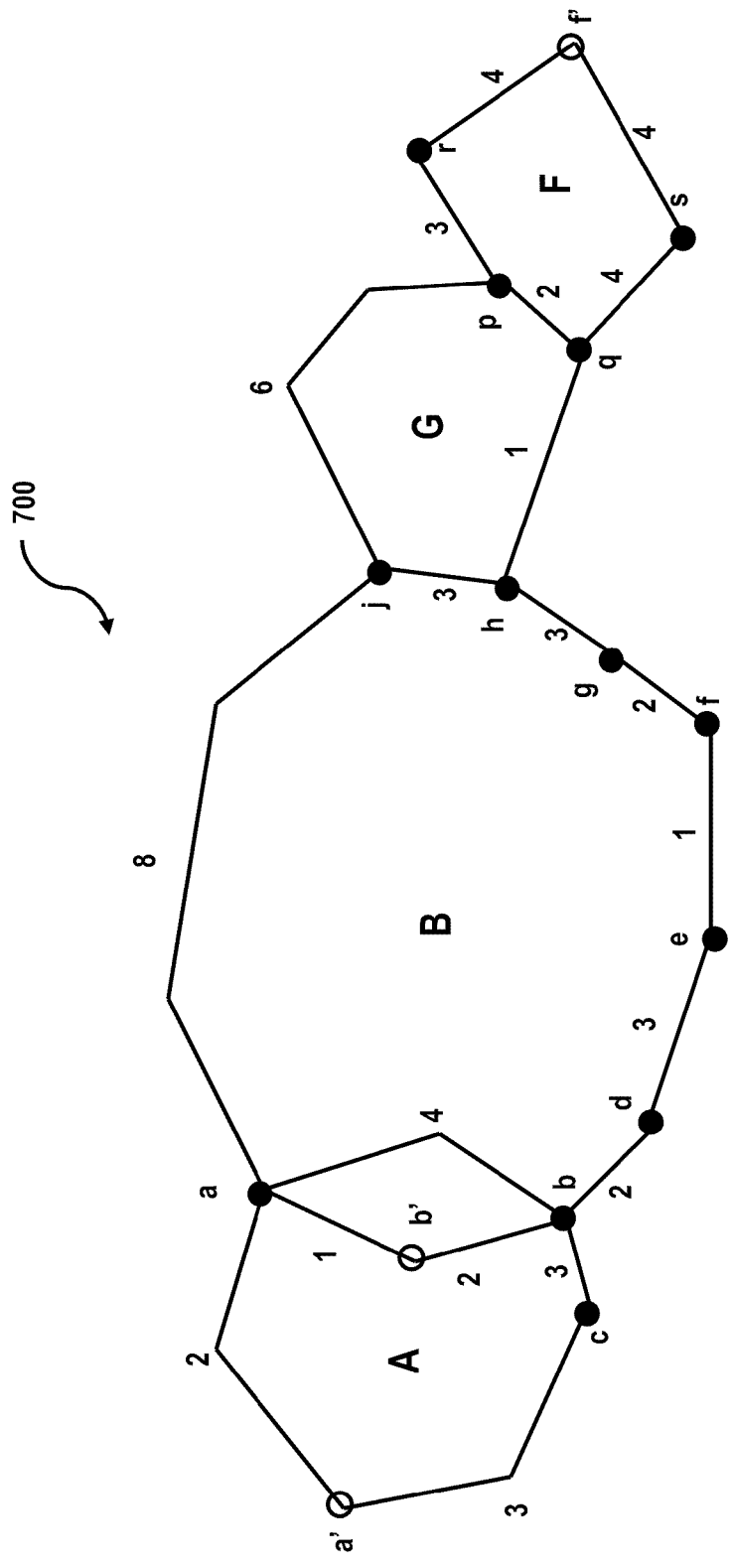
FIG. 7 is diagram of a portion of the ring network of FIG. 4, according to one embodiment.

Continuing with the example of FIG. 4, to find the node-SPF between a' and f', the ring-SPF A-B-G-F for this case that was computed previously is taken into consideration. Consequently, only the rings A, B, G and F (and their nodes) in FIG. 4 are retained and all other rings are removed. The resulting network 700 is illustrated in FIG. 7. Using an SPF algorithm, the process determines that a'-a-j-h-q-s-f' with cost=22 is the node-SPF.

FIG. 7 is diagram of a portion (graph 700) of the ring network of FIG. 4, according to one embodiment. In order to find the node-SPF between a and q, the process applies the SPF algorithm to yield ring-SPF B-G, and node-SPF a-j-h-q with cost=12. To compute the required node-SPF between a' and d', the two ring-SPFs A-B-D and A-C-D with equal costs are taken into consideration. With respect to rings A-B-D, using the SPF algorithm, it is determined that the node-SPF is a'-a-b'-b-d-e-f-o-d' with cost=19. On rings A-C-D, node-SPF is a'-c-l-m-n-d' with cost=13. Hence, ring-SPF is A-C-D and node-SPF is a'-c-l-m-n-d'.

Figure 8:
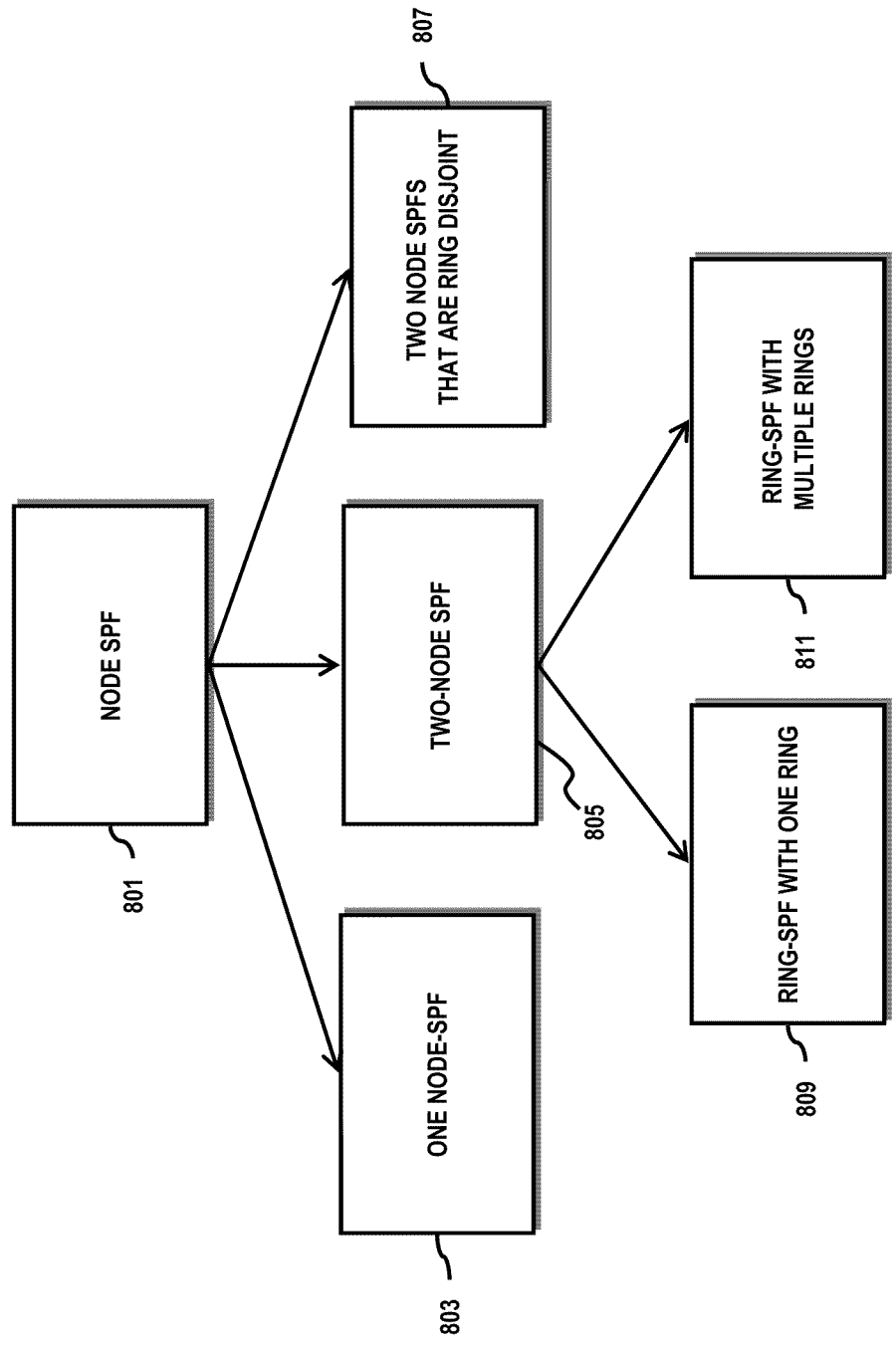
FIG. 8 is diagram of showing various methods for finding node-SPFs, according to certain embodiments.

FIG. 8 is diagram showing three types of node-SPFs that may be required to be calculated, according to certain embodiments. Depending on the requirements and/or application, a number of specific approaches, or options, can be utilized to determine the node-SPF 801, as shown in FIG. 8. In some instances, it may be necessary to find one node-SPF as in option 803 (such as that used in step 603). In other circumstances, the process utilizes determines two node-SPFs 805. Also, two node-SPFs that are ring disjoint can be determined, as depicted as option 807. For the case of two node-SPFS 805, it may depend on whether the ring-SPF has one ring as in option 809 or the ring-SPF has multiple rings as in option 811.

Figure 9:
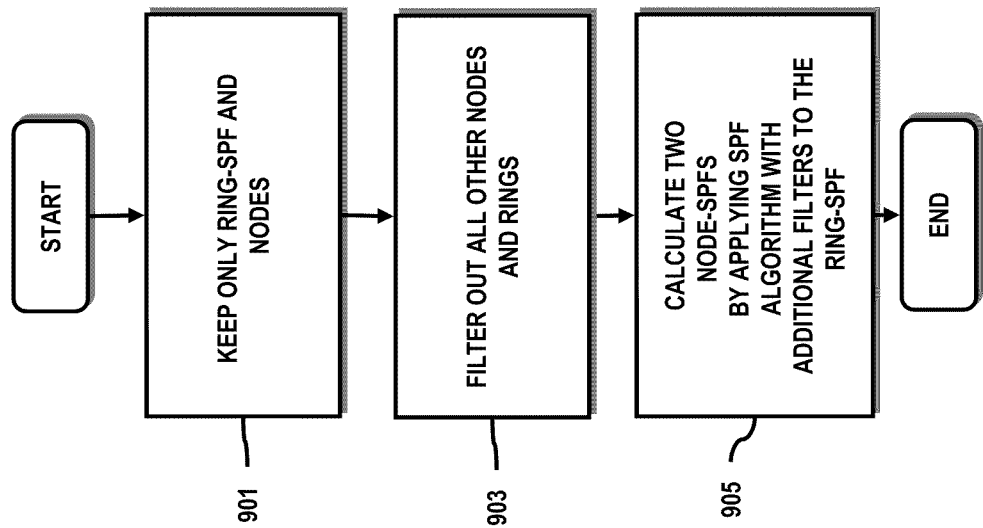
FIG. 9 is a flowchart of a process for determining two node-SPFs, according to one embodiment.

FIG. 9 is a flowchart of a process for determining two node-SPF, according to one embodiment. This process involves the determination of two node-SPFs (option 805). In step 901, the process retains only the ring-SPF and their nodes, and filters all other nodes and rings (of FIG. 4), per step

903. The node-SPFs are subsequently calculated using the SPF algorithm with additional filters as applied to the ring-SPF, as in step 905.

For option 809 in which the ring-SPF contains only one ring, the two node-SPFs (commonly referred to as east and west paths) are calculated using the SPF algorithm. For the case where ring-SPF includes more than one ring (as in option 811), the direct application of the SPF algorithm may result in blocking—i.e. the first node-SPF (i.e., the path) that is computed may not permit the process to find the second node-SPF. This happens when the node-SPF passes through more than one interconnect node between a pair of rings. Hence additional steps are required as outlined in FIG. 10.

Figure 10:
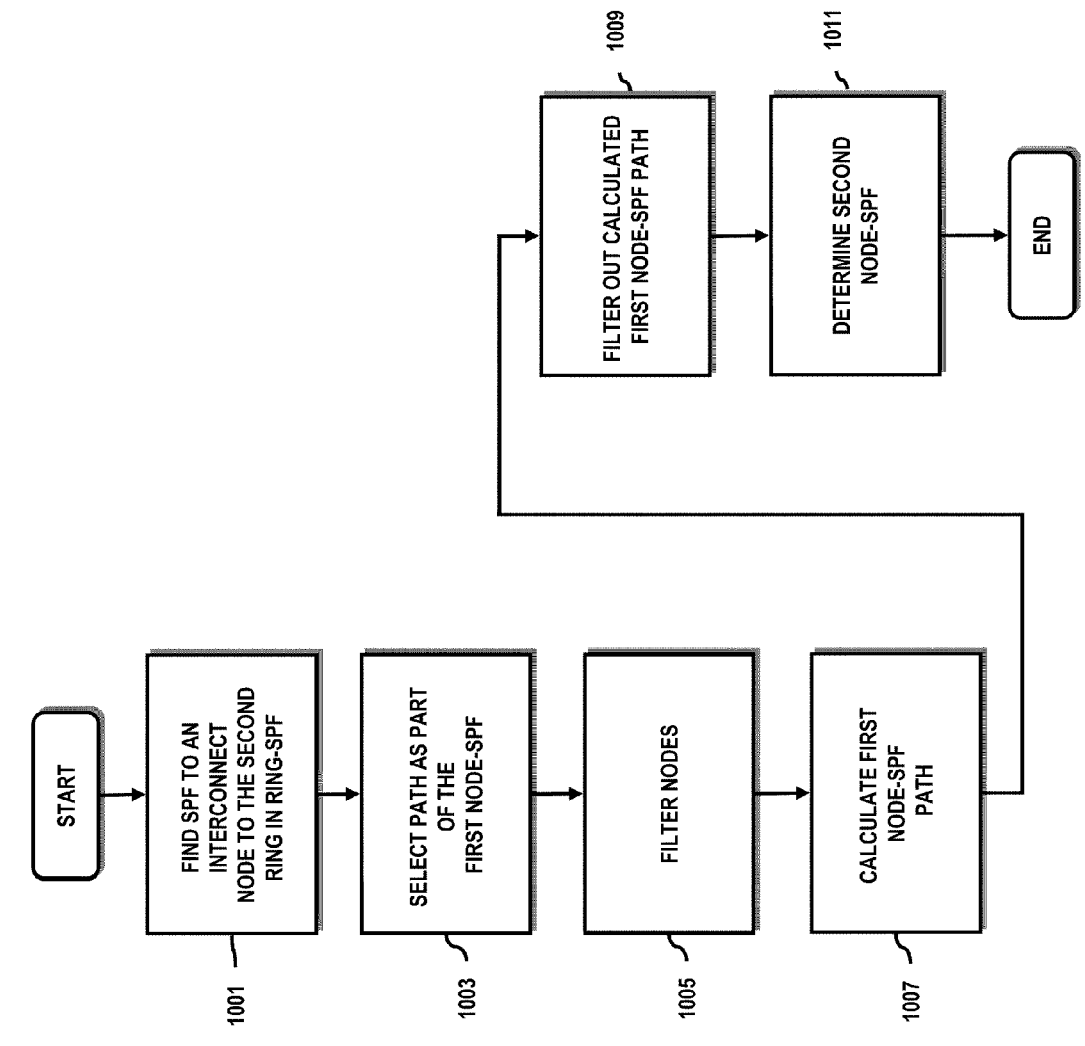
FIG. 10 is a flowchart of a process for determining two SPF paths involving filtering of some interconnect nodes and the first node-SPF path, according to one embodiment.

FIG. 10 is a flowchart of a process for determining two SPF paths involving filtering of some interconnect nodes and the first node-SPF path, according to one embodiment. In step 1001, the shortest path (e.g., SPF) to an interconnect node to the second ring in ring-SPF is determined. Next, the process involves selecting a path as part of the first node-SPF as in step 1003. The nodes are filtered as in step 1005, and the first node-SPF path is calculated (step 1007). In step 1009, the calculated first node-SPF path is filtered out. In step 1011, the second node-SPF is determined.

The above process is now described with respect to the ring network of FIG. 4. For the case in which two node-SPFs between a' and f' need to be determined, straight application of SPF algorithms would result in the node-SPF to be calculated as a'-a-j-h-q-s-f' (over ring-SPF A-B-G-F) of FIG. 4. However, examining FIG. 4 reveals that nodes j and h are the two interconnect nodes between rings B and G. If both the interconnect nodes in the first node-SPF are used, then it is determined that there is no other (disjoint) node (and link) available to connect rings B and G for the second node-SPF. Hence the above node-SPF is invalid in this case; and both the node-SPFs have to be recalculated as shown below.

From the start node (a') in the first ring (A) in ring-SPF, the shortest path to an interconnect node (a or b) to the second ring (B) in ring-SPF A-B-G-F is first calculated. It may be concluded that a'-a with cost=2 is the shortest. (All other possible paths from a' to a or b have costs greater than 2). Hence the path a'-a is selected as a part of the first node-SPF.

Between the pair of rings under consideration (i.e., A-B), all other interconnect nodes (i.e. b) are filtered out (i.e., removed) from the selected one (i.e., a). Hence the connecting links to b viz. b-a, b-b', b-c, and b-d are also removed from FIG. 4. The new graph is as shown in FIG. 11.

Figure 11:
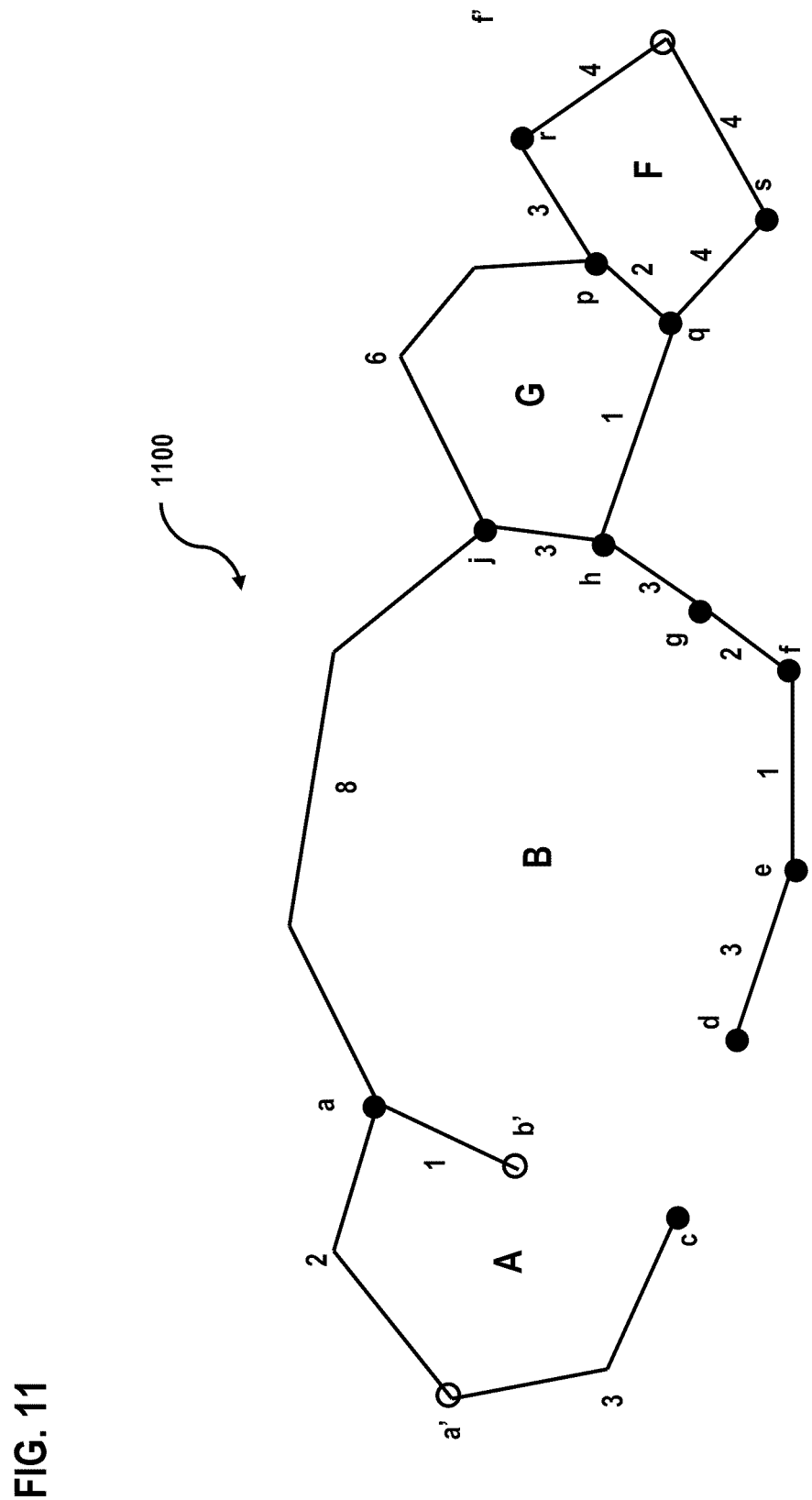
FIGS. 11-13 are diagrams of the ring-SPF of FIG. 4 in which certain nodes and associated interconnecting links are removed, according to various embodiments.
Figure 12:
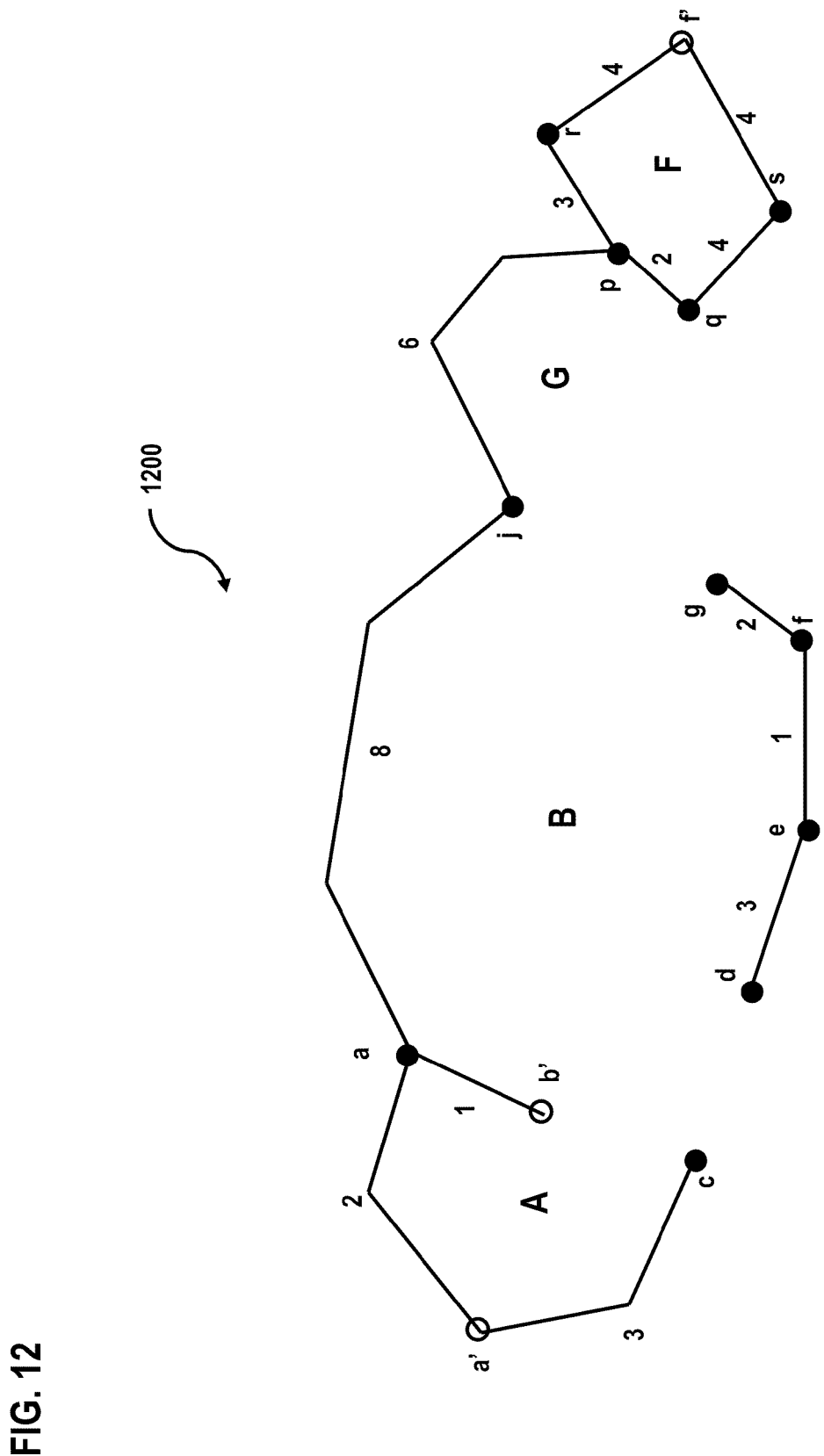
Figure 13:
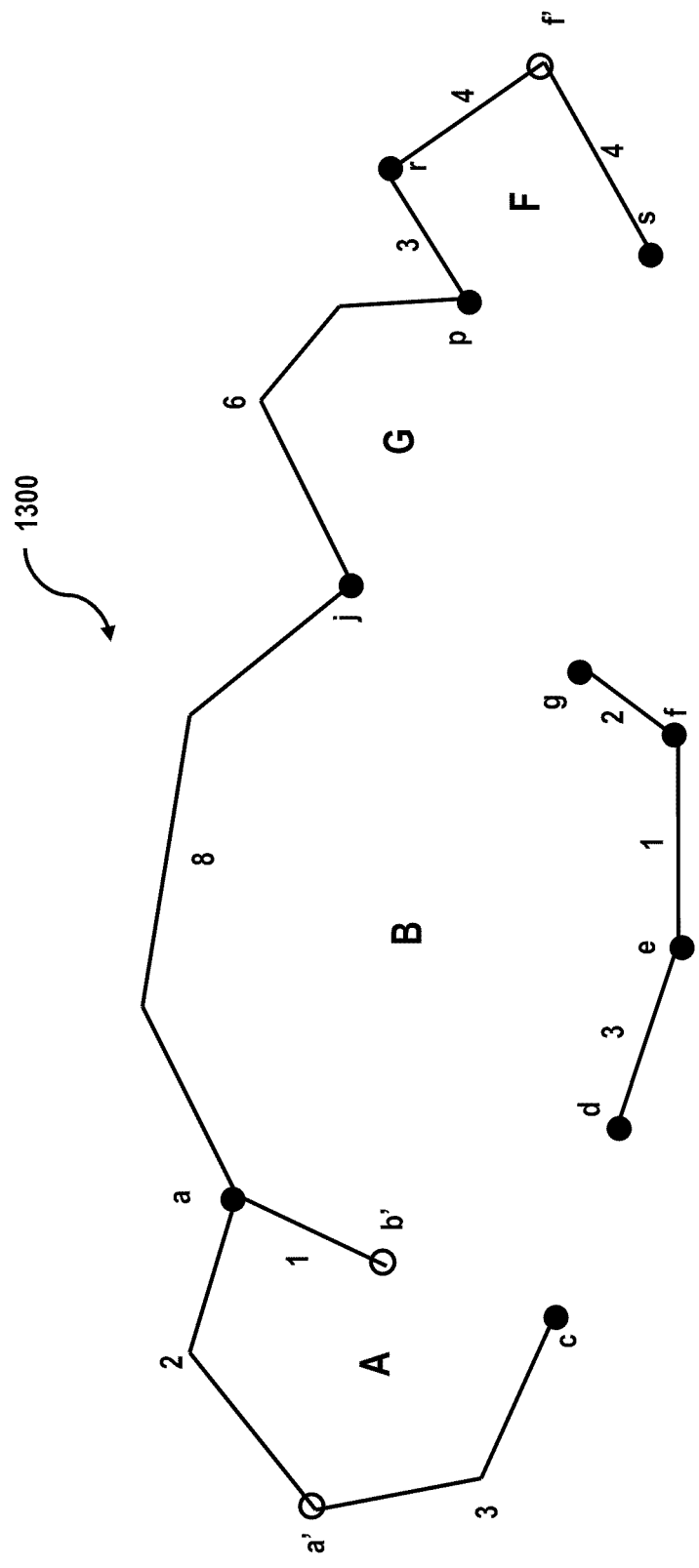

FIGS. 11-13 are diagrams of the ring-SPF of FIG. 4 in which certain nodes and associated interconnecting links are removed, according to various embodiments. In graph 1100 (FIG. 11), taking the next set of rings in ring-SPF i.e. B and G and considering a as the start node in ring B, the shortest path to the interconnect node (j or h) between rings B and G is calculated. It is concluded that the shortest path is a-j with cost=8. Consequently, a-j becomes the next part of the first node-SPF.

The next step involves filtering out node h and its connecting links to other nodes (h-g and h-q) in ring-SPF of FIG. 12.

As depicted in graph 1200 (of FIG. 12), node j is now the start node for path computation to interconnect node (p or q) between the next pair of rings G and F. It is then calculated that j-p is the shortest path (cost=6); and this result now becomes the next part of the first node-SPF.

The next process involves filtering out q and its connecting links (q-p and q-s), resulting in the graph of FIG. 13.

As seen in graph 1300 of FIG. 13, node p is now the start node for path computation. At this point, it is determined that node p and the end node f' are in the same ring F. The shortest path between them is found as p-r-f' with cost=7. Hence, the computed first node-SPF is a'-a-j-p-r-f' with total cost=23.

To determine the second node-SPF, the ring-SPF is considered again (A-B-G-F) and the calculated first node-SPF path (a'-a-j-p-r-f') is filtered out from the graph of FIG. 7. Subsequently, the second node-SPF is determined by calculating the shortest path between a' and f'—it is a'-c-b-d-e-f-g-h-q-s-f' with cost=26.

Of the two calculated node-SPFs, the one with lower cost is generally used as the working path and the other used as the protection path.

Figure 14:
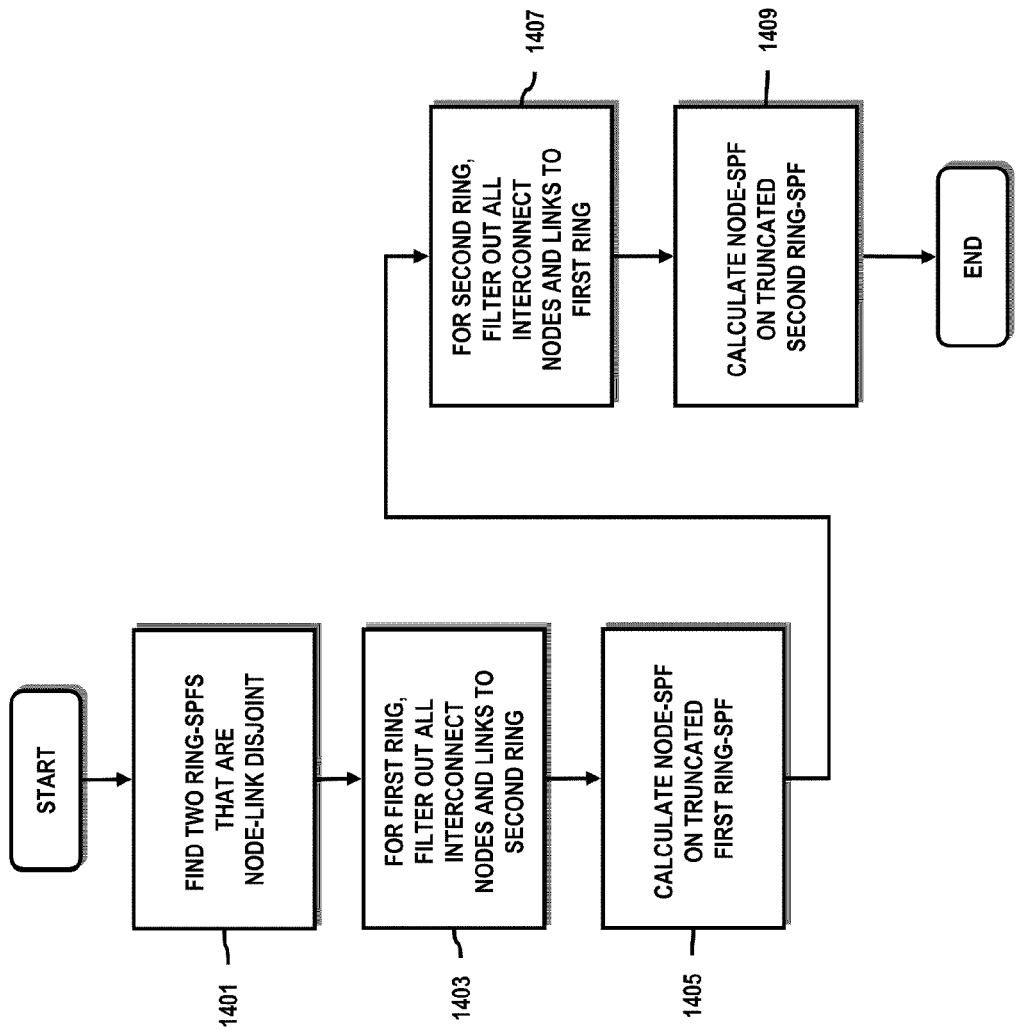
FIG. 14 is a flowchart of a process for determining SPF paths involving filtering of interconnect nodes and links, according to one embodiment.

FIG. 14 is a flowchart of a process for determining SPF paths involving filtering of interconnect nodes and links, according to one embodiment. In this example, the process of determining two node-SPFs that are ring disjoint (as in option 807) is described. This scenario is a special case where the two node-SPFs do not have any common intermediate rings in their paths (however, the start and end rings would be the same). The process involves finding two ring-SPFs that are also node-link disjoint—i.e., the two ring-SPFs do not share any common node or link between the start and end ring, as in step 1401. This determination is calculated using methods like K-SPF algorithms, Suurballe algorithms etc., according to one embodiment.

In step 1403, the first ring-SPF is considered, whereby all the interconnect nodes and links to the second ring-SPF are filtered out. For example, A-B-D and A-C-D are set as the first and second ring-SPFs. While considering A-B-D, the process filters all the interconnect nodes and links from Rings A, B and D to ring C (intermediate ring in second ring-SPF).

Next, the process, per step 1405, entails determining one node-SPF (between start and end nodes) in the truncated first ring-SPF A-B-D using the process detailed in FIG. 6. The second ring-SPF, such as A-C-D, is considered, such that the interconnect nodes and links to the first ring—i.e., links from Rings A, C and D to ring B—are filtered out, per step 1407. Lastly, the process, as in step 1409, determines one node-SPF (between start and end nodes) in the truncated second ring-SPF A-C-D using the calculations detailed in FIG. 6. The calculated two node-SPFs are then referred to as being ring-disjoint from each other.

The above process is explained in the context of the following example. It is required to find two node-SPFs of FIG. 4 between c and e' that are also ring-disjoint. Node c belongs to rings A and C and e' belongs to ring E. In FIG. 5, two ring-SPFs between start rings (A or C) and end ring E need to be found. In this example, the two ring-SPFs do not share any intermediate ring. Applying a K-SPF algorithm to the graph 500 (of FIG. 5) results in two ring-SPFs C-D-E and A-B-E with costs=3 and 4 respectively. It is noted that the two ring-SPFs have different intermediate rings, D and B (in which the Start/End rings can be same or different).

Figure 15:
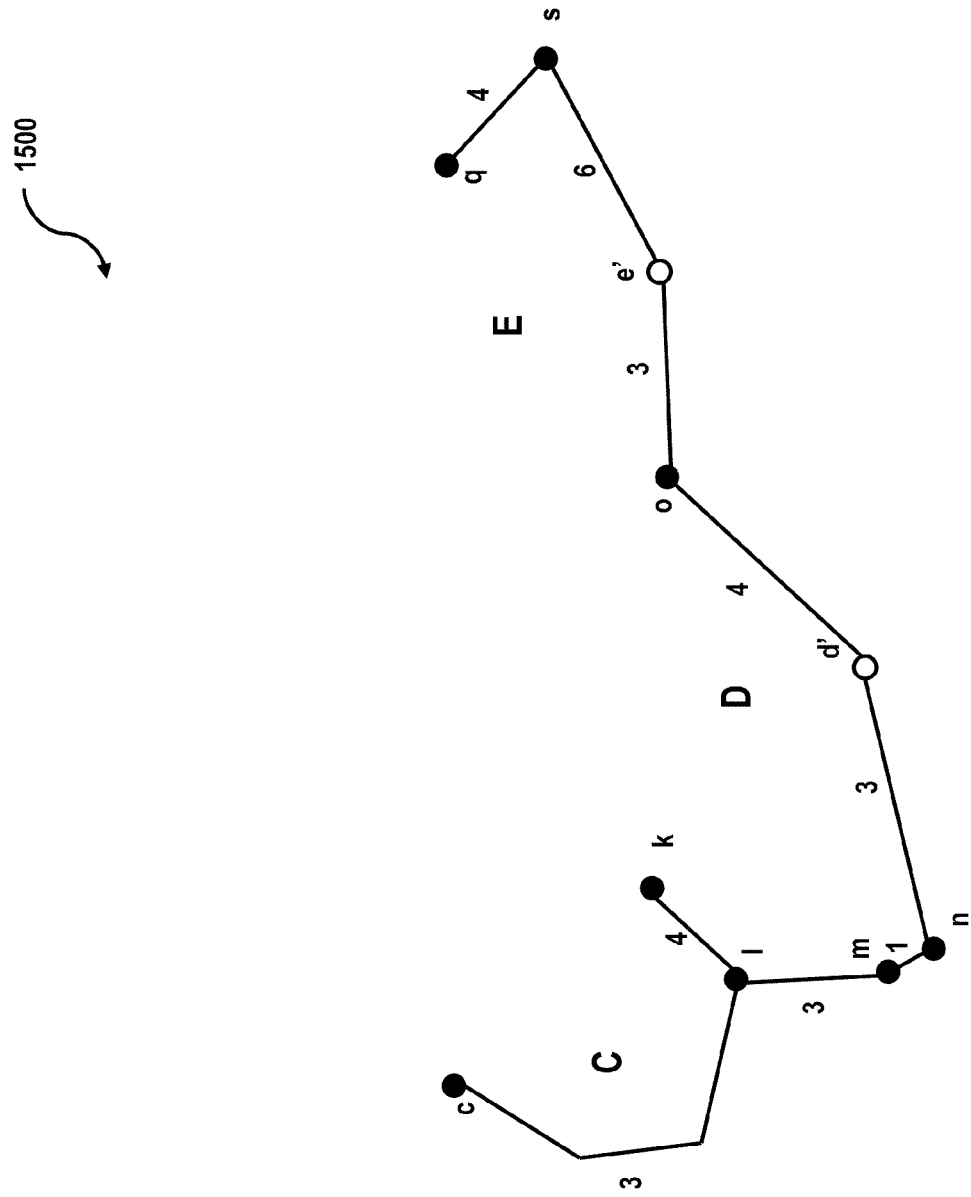
FIGS. 15 and 16 are diagrams of another exemplary ring-SPF of FIG. 7 in which certain nodes and associated interconnecting links are removed, according to one embodiment.

Considering the first ring-SPF C-D-E, all the interconnect nodes and links from rings C, D and E to ring B—viz. b, d, e, f, g and h are filtered out resulting in graph 1500 of FIG. 15.

Figure 16:
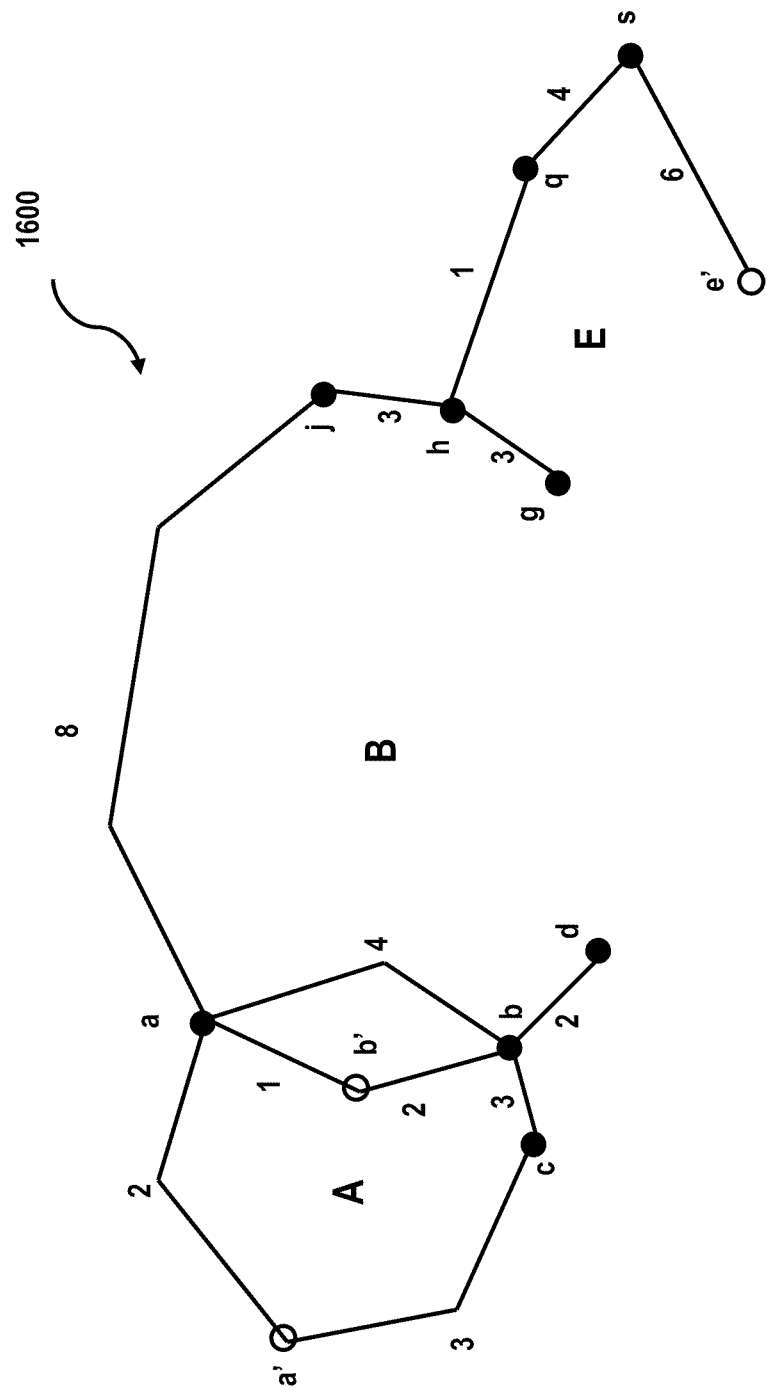

FIGS. 15 and 16 are diagrams of another exemplary ring-SPF of FIG. 7 in which certain nodes and associated interconnecting links are removed, according to one embodiment. Using the process of FIG. 6, the node-SPF on this truncated ring-SPF is calculated as c-l-m-n-d'-o-e'. Considering the second ring-SPF A-B-E, all the interconnect nodes and links from rings A, B and E to ring D—viz. e, f and o are filtered out resulting in the network represented by graph 1600 of FIG. 16.

Using the process of FIG. 6, the node-SPF on this truncated ring-SPF is calculated as c-a'-a-j-h-q-s-e'. As a special case, only where the start and/or end node is an interconnect node, it may be possible to find two node-SPFs that do not have a common start and/or end ring. For example if the start node (an interconnect node in this case) belongs to two rings A and B, then first ring-SPF would use ring A and the second, ring B.

There may be a case where rings are interconnected by two or more point-to-point links. For example, the rings D and H of FIG. 4 are interconnected by two point-to-point links. For ring-SPF calculations, the two nodes of each point-to-point link is collapsed into a single node and the point-to-point links themselves are ignored. For node-SPF calculations, whenever the calculated path crosses a particular point-to-point link, its cost is also taken into consideration. Thus this case is almost identical to rings interconnected through common nodes.

These are atypical cases that may occur at edges of the networks—e.g. a small ring I interconnected to a larger ring F through a single node r as in FIG. 4. When a single node-SPF to these rings (nodes in them) is required, the same calculations of FIG. 6 are applied.

For the case where two node-SPFs are required, the calculations outlined in FIGS. 10 and 14 (depending on requirements) are utilized to find two paths from a given start node up to the single interconnect node r in rings I. Thus, there are two diverse paths only up to the interconnect node. From the interconnect node, paths (called East and West) to the end node in ring I are determined.

In the above example, the ring I could be interconnected to ring F by one point-to-point link instead; node-SPF calculations, however, remain the same.

The above procedure, according to one embodiment, can be used for fast network recovery, as next described.

Figure 17:
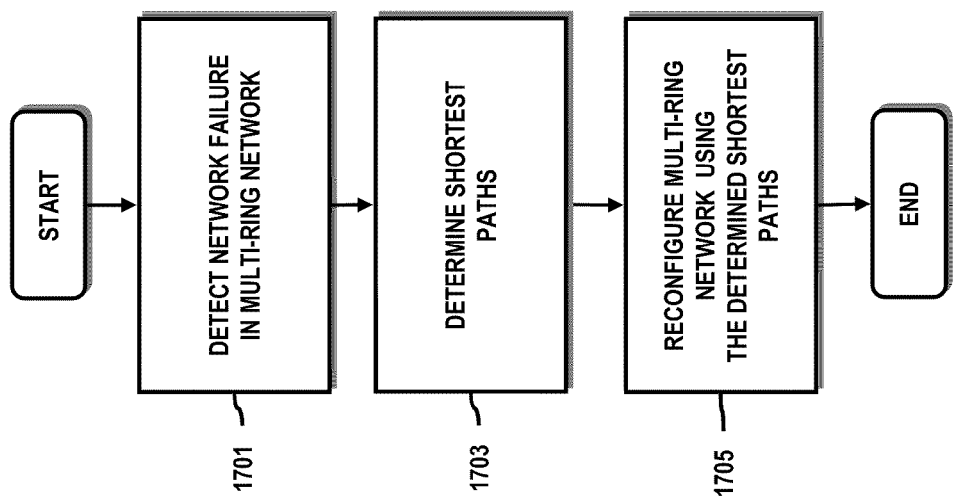
FIG. 17 is a flowchart of a process for recovering from a network failure, according to one embodiment.

FIG. 17 is a flowchart of a process for recovering from a network failure, according to one embodiment. For the purpose of illustration, this process is described with respect to the system 100 of FIG. 1A. Under this scenario, the multi-ring network 101 experiences a failure, either in the cabling (e.g., optical fiber cut, etc.) or network element (e.g., ADM fails), as to require reconfiguration of the communication paths within the multi-ring network 101. In step 1701, the network management system 103 detects a network failure, and thus, invokes the shortest path logic 105 to determine the shortest paths within the multi-ring network 101, per step 1703, as part of a network recovery procedure. This determination is performed according to the processes described earlier, whereby the logic 105 accesses topological information about the network 101. After the shortest paths are determined, the network management system 103 can reconfigure the multi-ring network 101 using the determined shortest paths (step 1705). Thereafter, the network traffic can resume transport based on the new paths. Rapid recovery is imperative to a critical network, such as that of the multi-ring network 101, which serves as a backbone network for the many diverse networks 111-117.

The above described processes, according to certain embodiment, advantageously factor ring topology and ring interconnections, thereby yielding accurate shortest paths in a multi-ring network. These paths are more logical and manageable than that determined by conventional techniques. Further, because ring topology is considered, the processes can better provide load balancing on links, policy enforcement and network management.

The processes for determining the shortest paths in a multi-ring system described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 18:
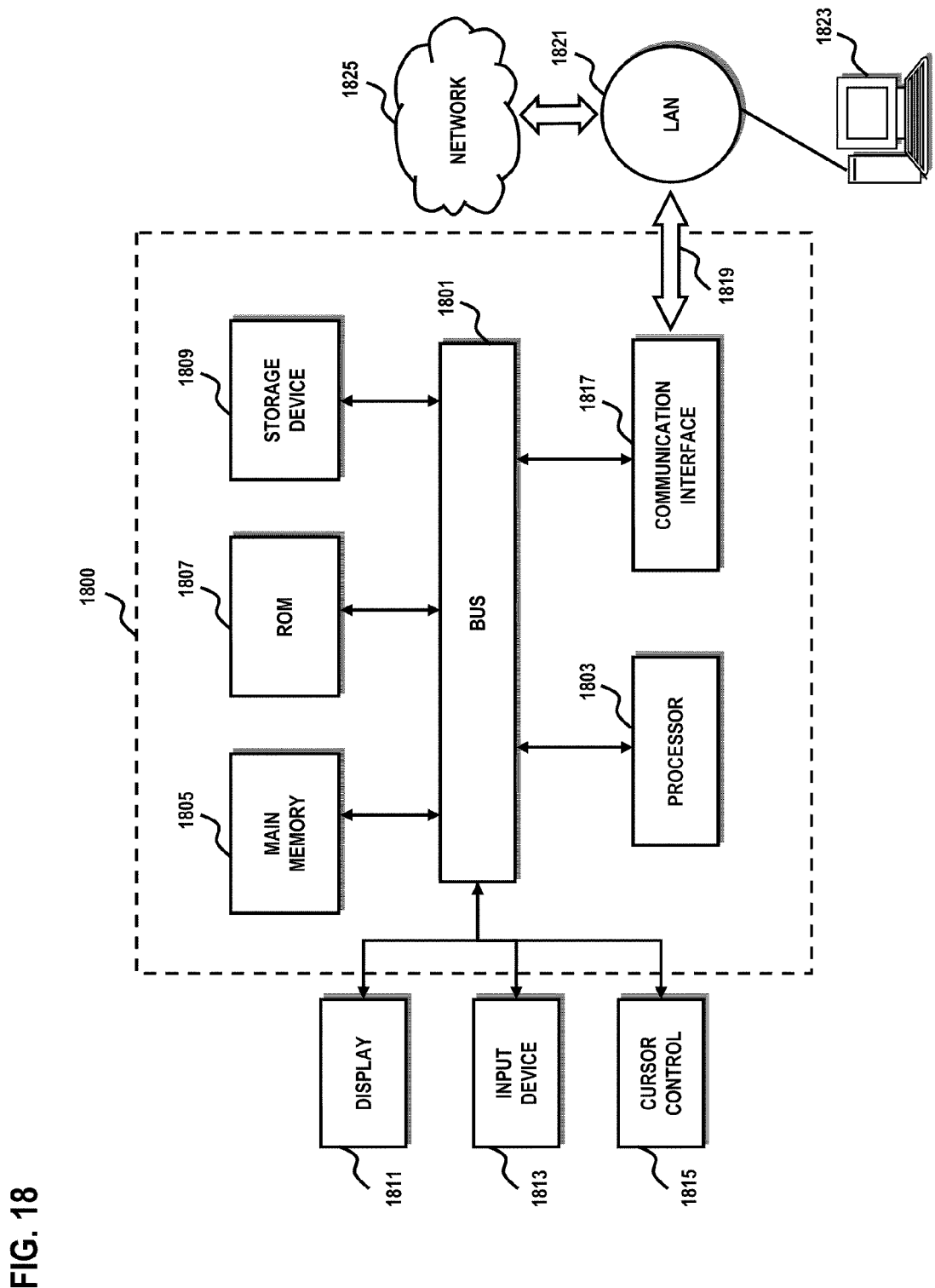
FIG. 18 is a diagram of a computer system that can be used to implement various exemplary embodiments.

FIG. 18 illustrates computing hardware (e.g., computer system) 1800 upon which an embodiment according to the invention can be implemented. The computer system 1800 includes a bus 1801 or other communication mechanism for communicating information and one or more processors (of which one is shown) 1803 coupled to the bus 1801 for processing information. The computer system 1800 also includes main memory 1805, such as a random access memory (RAM) or other dynamic storage device, coupled to the bus 1801 for storing information and instructions to be executed by the processor 1803. Main memory 1805 can also be used for storing temporary variables or other intermediate information during execution of instructions by the processor 1803. The computer system 1800 may further include a read only memory (ROM) 1807 or other static storage device coupled to the bus 1801 for storing static information and instructions for the processor 1803. A storage device 1809, such as a magnetic disk or optical disk, is coupled to the bus 1801 for persistently storing information and instructions.

The computer system 1800 may be coupled via the bus 1801 to a display 1811, such as a cathode ray tube (CRT), liquid crystal display, active matrix display, or plasma display, for displaying information to a computer user. An input device 1813, such as a keyboard including alphanumeric and other keys, is coupled to the bus 1801 for communicating information and command selections to the processor 1803. Another type of user input device is a cursor control 1815, such as a mouse, a trackball, or cursor direction keys, for communicating direction information and command selections to the processor 1803 and for adjusting cursor movement on the display 1811.

According to an embodiment of the invention, the processes described herein are performed by the computer system 1800, in response to the processor 1803 executing an arrangement of instructions contained in main memory 1805. Such instructions can be read into main memory 1805 from another computer-readable medium, such as the storage device 1809. Execution of the arrangement of instructions contained in main memory 1805 causes the processor 1803 to perform the process steps described herein. One or more processors in a multi-processing arrangement may also be employed to execute the instructions contained in main memory 1805. In alternative embodiments, hard-wired circuitry may be used in place of or in combination with software instructions to implement the embodiment of the invention. Thus, embodiments of the invention are not limited to any specific combination of hardware circuitry and software.

The computer system 1800 also includes a communication interface 1817 coupled to bus 1801. The communication interface 1817 provides a two-way data communication coupling to a network link 1819 connected to a local network 1821. For example, the communication interface 1817 may be a digital subscriber line (DSL) card or modem, an integrated services digital network (ISDN) card, a cable modem, a telephone modem, or any other communication interface to provide a data communication connection to a corresponding type of communication line. As another example, communication interface 1817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1817 sends and receives electrical, electromagnetic, or optical signals that carry digital data streams representing various types of information. Further, the communication interface 1817 can include peripheral interface devices, such as a Universal Serial Bus (USB) interface, a PCMCIA (Personal Computer Memory Card International Association) interface, etc. Although a single communication interface 1817 is depicted in FIG. 18, multiple communication interfaces can also be employed.

The network link 1819 typically provides data communication through one or more networks to other data devices. For example, the network link 1819 may provide a connection through local network 1821 to a host computer 1823, which has connectivity to a network 1825 (e.g. a wide area network (WAN) or the global packet data communication network now commonly referred to as the "Internet") or to data equipment operated by a service provider. The local network 1821 and the network 1825 both use electrical, electromagnetic, or optical signals to convey information and instructions. The signals through the various networks and the signals on the network link 1819 and through the communication interface 1817, which communicate digital data with the computer system 1800, are exemplary forms of carrier waves bearing the information and instructions.

The computer system 1800 can send messages and receive data, including program code, through the network(s), the network link 1819, and the communication interface 1817. In the Internet example, a server (not shown) might transmit requested code belonging to an application program for implementing an embodiment of the invention through the network 1825, the local network 1821 and the communication interface 1817. The processor 1803 may execute the transmitted code while being received and/or store the code in the storage device 1809, or other non-volatile storage for later execution. In this manner, the computer system 1800 may obtain application code in the form of a carrier wave.

The term "computer-readable medium" as used herein refers to any medium that participates in providing instructions to the processor 1803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1809. Volatile media include dynamic memory, such as main memory 1805. Transmission media include coaxial cables, copper wire and fiber optics, including the wires that comprise the bus 1801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
retrieving topology information associated with a ring network that includes a plurality of rings, each of the rings including one or more nodes;
selecting a start node and an end node associated with the ring network;
determining one or more rings of the plurality of rings that include the start node and the end node;
determining a minimum set of one or more interconnected rings of the ring network associated with the determined one or more rings that include the start node and the end node using a shortest path first algorithm; and
determining one or more shortest paths between the start node and the end node on the determined minimum set,
wherein determining a minimum set of interconnected rings associated with the determined one or more rings that include the start node and the end node comprises collapsing each ring into a node and for each ring node, determining a cost of ring interconnection between each immediately connected ring, and selecting the interconnected rings having the lowest total cost of ring interconnection between the start node and the end node as the minimum set.

2. A method according to claim 1, further comprising:
retaining only the minimum set of interconnected rings and corresponding nodes,
wherein the one or more shortest paths is determined based on the retained minimum set.

3. A method according to claim 1, further comprising:
determining a shortest path to an interconnect node corresponding to the minimum set of interconnected rings,
wherein an interconnect node is a node that is connected to at least two rings of the minimum set of interconnected rings.

4. A method according to claim 1, further comprising:
selectively filtering the one or more nodes,
wherein the determination of the one or more shortest paths is according to the shortest path first algorithm including Dijkstra's algorithm and the selective filtering.

5. A method according to claim 1, further comprising:
detecting a network failure in the multi-ring network; and
reconfiguring the multi-ring network in response to the detection according to the determined one or more shortest paths.

6. A method according to claim 1, wherein the multiple ring network is an optical network.

7. An apparatus comprising:
a database configured to store topology information associated with a ring network that includes a plurality of rings, each of the rings including one or more nodes; and logic coupled to the database and configured to select a start node and an end node associated with the ring network, wherein the logic is further configured to determine one or more rings of the plurality of rings that include the start node and the end node, to determine a minimum set of one or more interconnected rings of the ring network associated with the determined one or more rings that include the start node and the end node using a shortest path first algorithm, and to determine one or more shortest paths between the start node and the end node on the determined minimum set, wherein to determine a minimum set of interconnected rings associated with the determined one or more rings that include the start node and the end node comprises collapsing each ring into a node and for each ring node, determining a cost of ring interconnection between each immediately connected ring, and selecting the interconnected rings having the lowest total cost of ring interconnection between the start node and the end node as the minimum set.

8. An apparatus according to claim 7, wherein the logic is further configured to retain only the minimum set of interconnected rings and corresponding nodes, and wherein the one or more shortest paths is determined based on the retained minimum set.

9. An apparatus according to claim 7, wherein the logic is further configured to determine a shortest path to an interconnect node corresponding to the minimum set of interconnected rings, wherein an interconnect node is a node that is connected to at least two rings of the minimum set of interconnected rings.

10. An apparatus according to claim 7, wherein the determination of the one or more shortest paths is according to the shortest path first algorithm including Dijkstra's algorithm and selective filtering of the one or more nodes.

11. An apparatus according to claim 7, wherein the logic is further configured to detect a network failure in the multi-ring network, and to reconfigure the multi-ring network in response to the detection according to the determined one or more shortest paths.

12. An apparatus according to claim 7, wherein the multiple ring network is an optical network.

13. A method comprising:

selecting a start node and an end node associated with a multiple ring network;

determining one or more rings, within the multiple ring network, that include the start node and the end node;

determining a ring-shortest path first (SPF) by finding a minimum set of interconnected rings required for a path between the start node and the end node according to a shortest path first algorithm; and determining one or more node-SPFs by finding one or more shortest paths between the start node and the end node on the ring-SPF according to the shortest path first algorithm and selective filtering of nodes of the multiple ring network, wherein finding a minimum set of interconnected rings required for a path between the start node and the end node comprises collapsing each ring into a node and for each ring node, determining a cost of ring interconnection between each immediately connected ring, and selecting the interconnected rings having the lowest total cost of ring interconnection between the start node and the end node as the minimum set.

14. A method according to claim 13, further comprising: retaining only the ring-SPF and corresponding nodes, wherein the one or more shortest paths is determined based on the retained ring-SPF and the retained nodes.

15. A method according to claim 13, further comprising: determining a shortest path to an interconnect node corresponding to a ring in the ring-SPF, wherein an interconnect node is a node that is connected to at least two rings in the ring-SPF.

16. A method according to claim 13, wherein the shortest path first algorithm includes Dijkstra's algorithm.

17. A method according to claim 13, further comprising: detecting a network failure in the multiple ring network; and reconfiguring the multiple ring network in response to the detection according to the determined node-SPFs.

* * * * *